United States Patent Office 3,391,611
Patented July 9, 1968

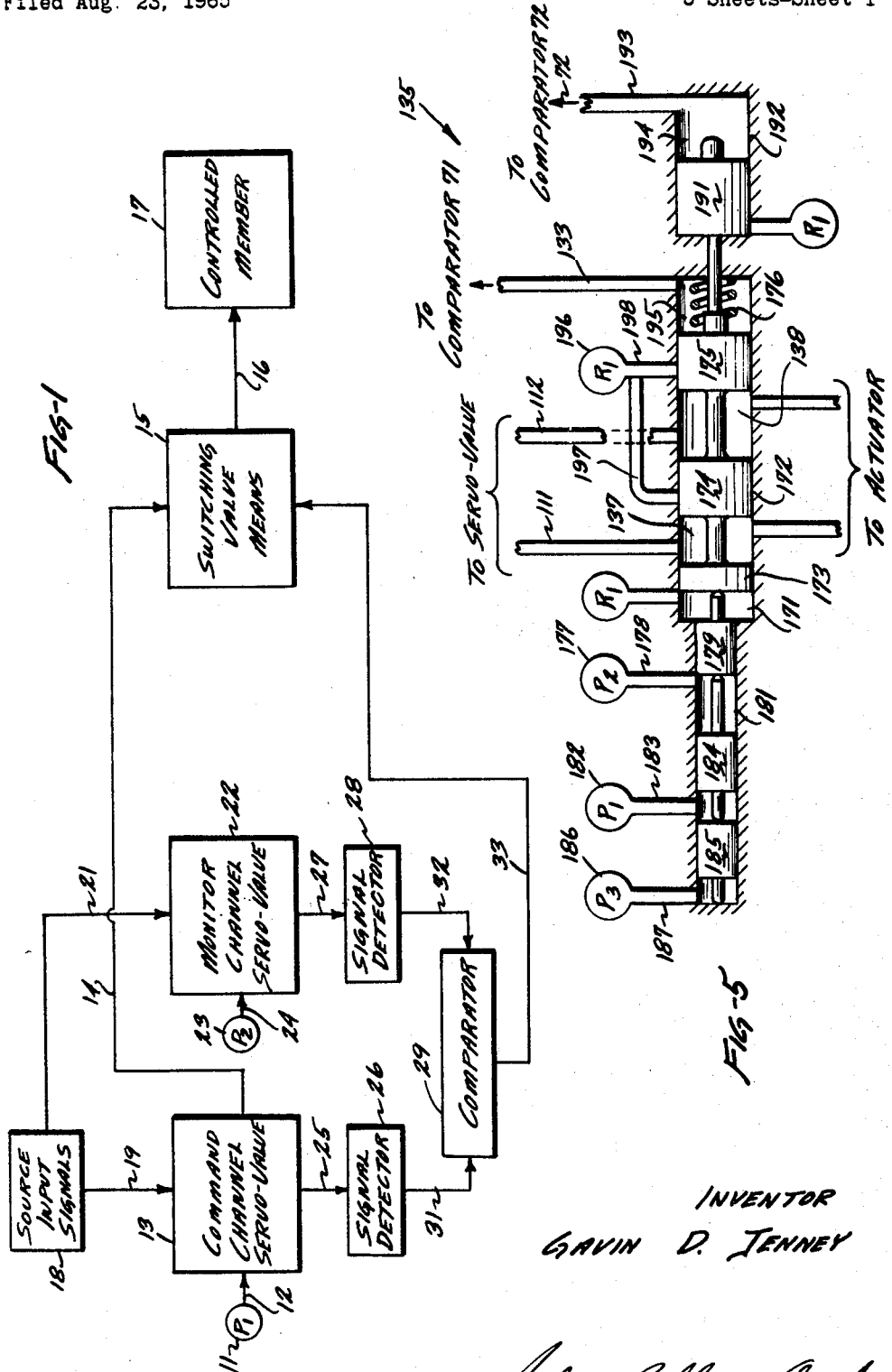

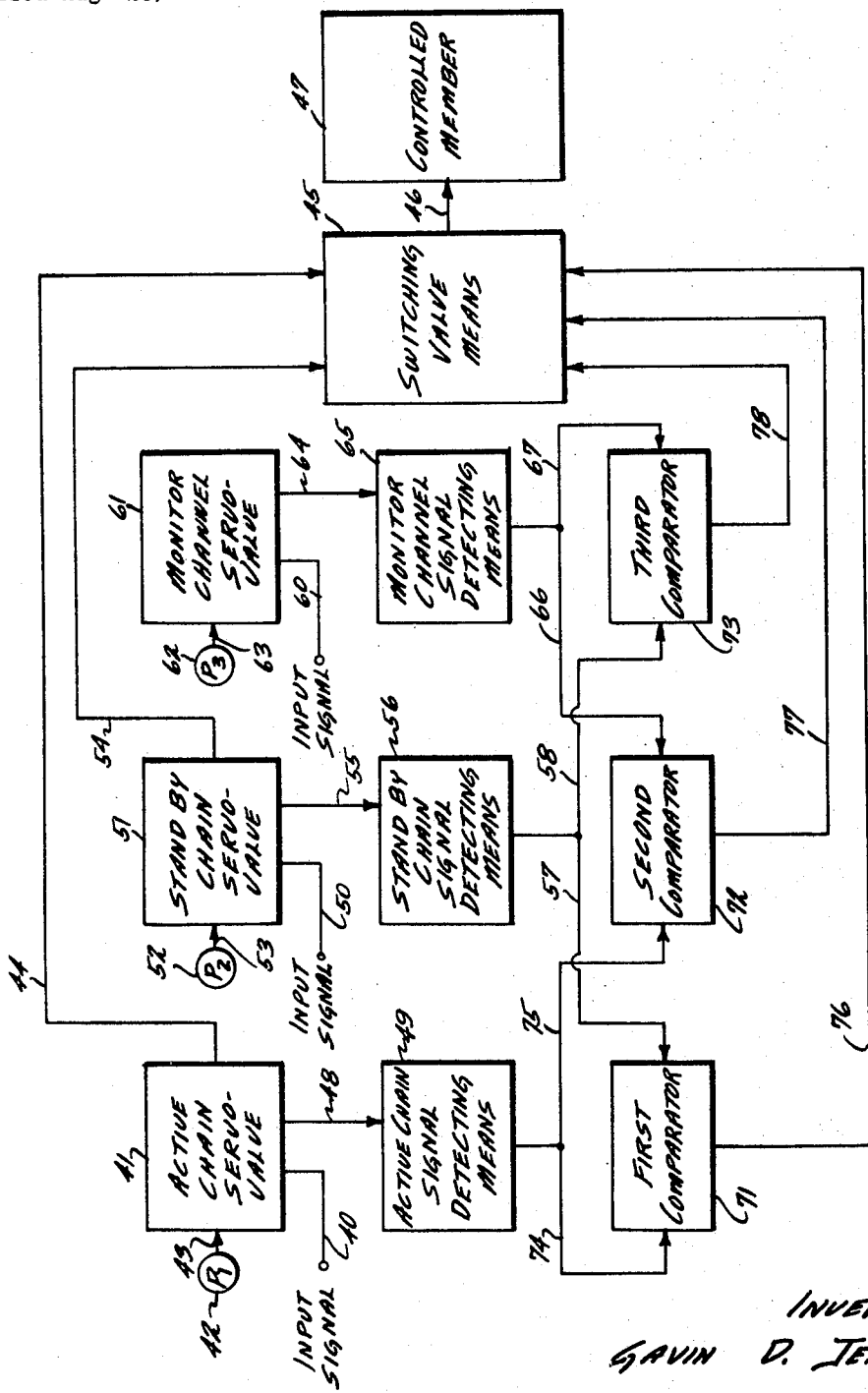

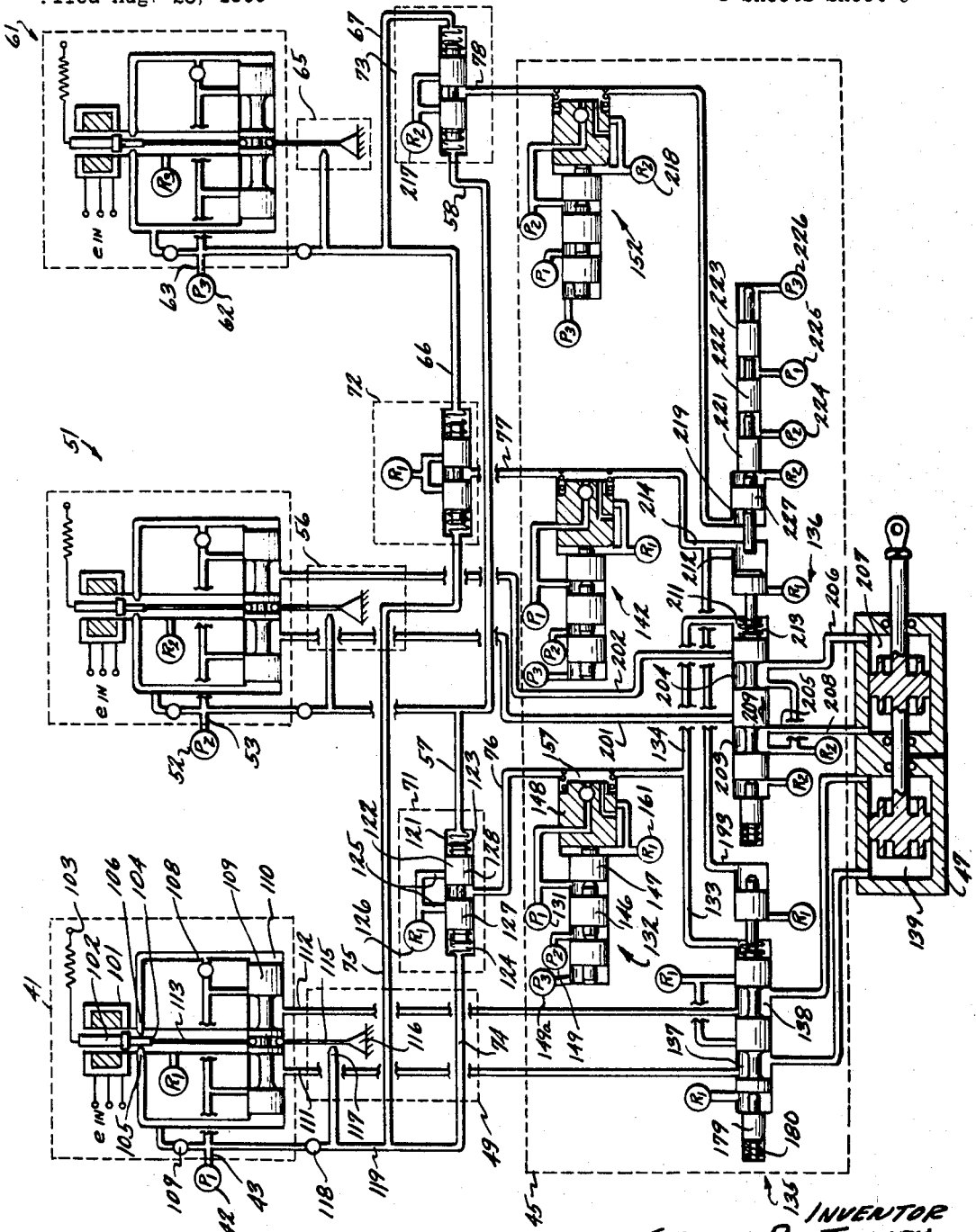

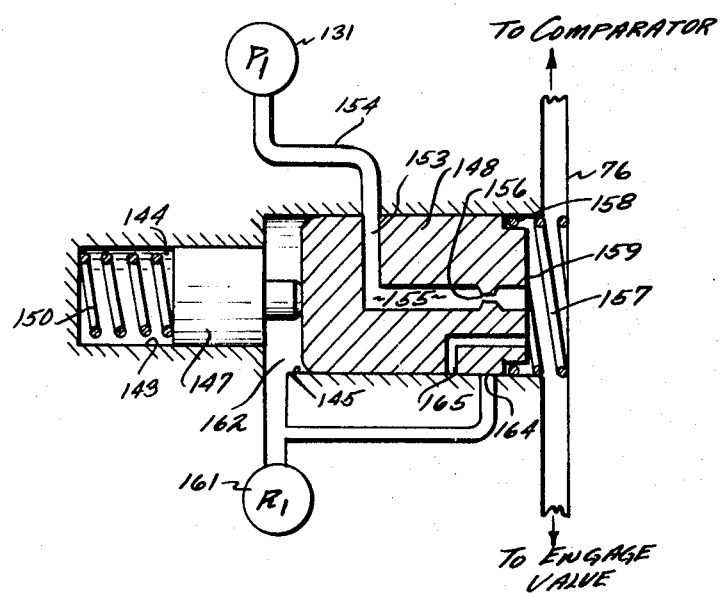
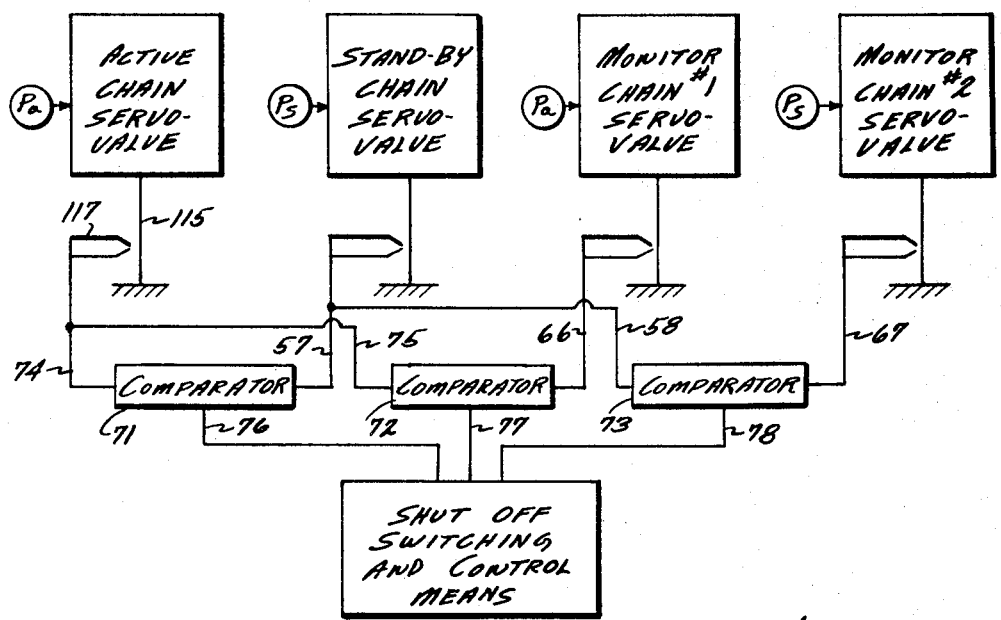

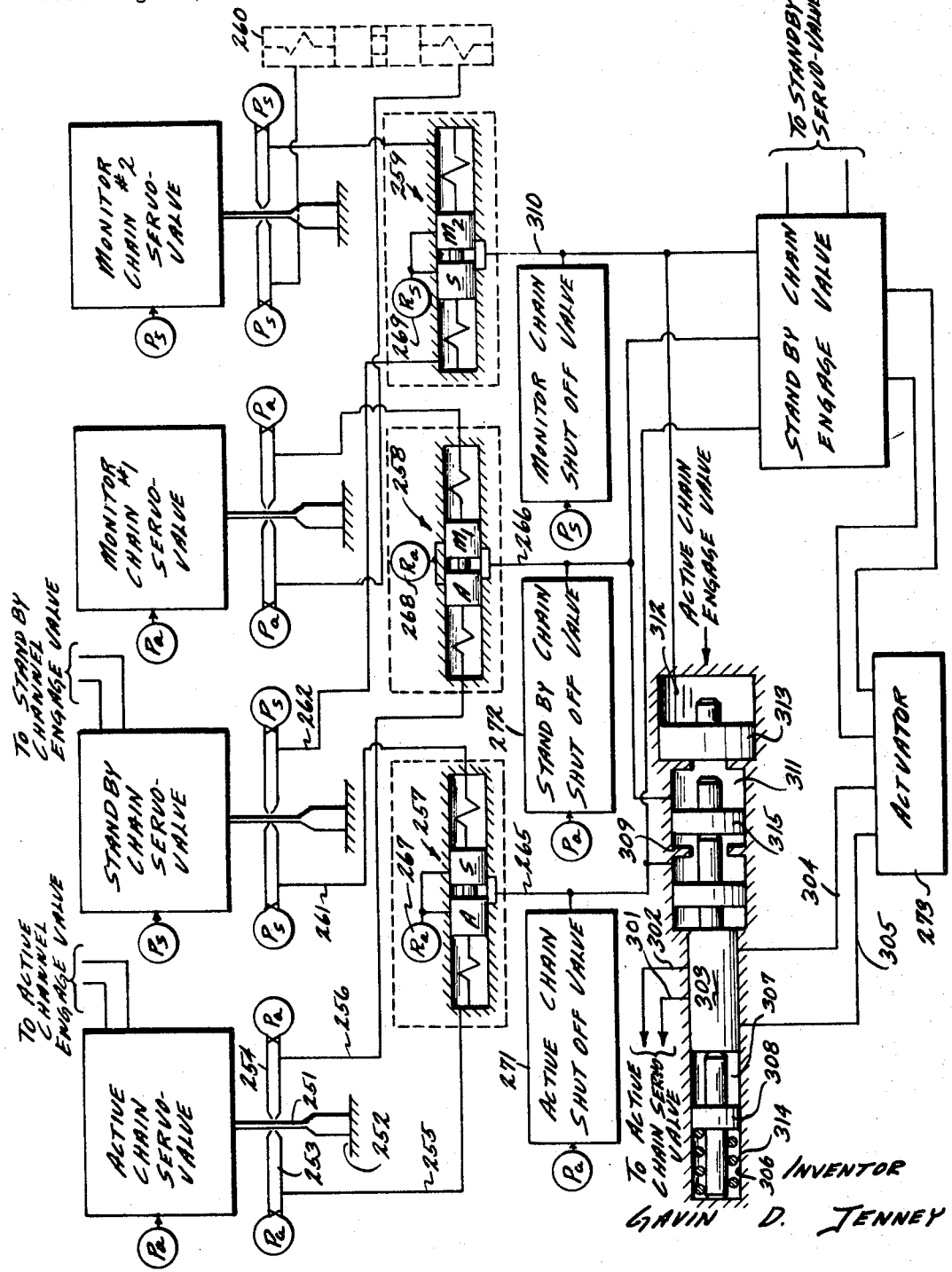

3,391,611
HYDRAERIC CONTROL SYSTEM
Gavin D. Jenney, Sepulveda, Calif., assignor to Bell Aerospace Corporation, a corporation of Delaware
Filed Aug. 23, 1965, Ser. No. 481,981
20 Claims. (Cl. 91—459)

ABSTRACT OF THE DISCLOSURE

Disclosed is a hydraeric control system which may be interconnected to effect movement of the controlled member in response to the application of input signals thereto. The system may function in a fail-safe mode of operation or a fail-operate, fail-safe mode of operation. In either event, a command function chain and a monitor function chain are provided and each supplies signals indicative of the desired position of the controlled member. Such signals are detected by a passive follower detecting means and the output of this detector is applied to a comparator. The comparator through its interconnections with the command monitor chains ascertains whether there is agreement within the command and monitor chains, that is, a coincidence of the signals thereof, and if noncoincidence exists, then wherein such noncoincidence exists. In the event there is a noncoincidence within the command or monitored chains of the signals therefrom, a switching device is activated which affects the control system command function. Each of the chains includes an electrohydraulic servo valve with a passive follower flapper which moves in response to movement of the power amplifier in the electrohydraulic servo valve. Movement of the passive flapper generates a pressure signal which is applied to selected ones of spool valves in such a manner as to compare the pressure signals appearing in each of the chains. In the event of noncoincidence, the spool valves translate, which translation affects the pressure applied to switching spool valve devices to affect system command function to the controlled member.

---

This invention relates generally to control systems, and more particularly to hydraerically powered control systems. More specifically, this invention is concerned with redundant control systems wherein hydraeric signals are used for the purpose of comparing the operational functioning of selected portions of a control system and then for switching the control system command function in response to predetermined failures within the control system or portions thereof. The term "hydraeric" as used throughout this specification and the appended claims is defined as being generic to hydraulic and pneumatic and as synonymous, in the broad sense, with fluid under pressure. The term "command function" as used throughout this specification and the appended claims is defined as meaning the ability to effect movement of a controlled member in response to input signals.

Systems for effecting control of any given controlled member are well known in the prior art. Such systems are capable of being utilized in any desired application such as, for example, in control of machine tools on a production line, portions of an automatic chemical processing plant, the control surfaces of an aircraft, or the like. The control system in accordance with the present invention is not to be limited by a particular or specific application to which the same may be put. It is, therefore, to be expressly understood that the controlled member upon which the system in accordance with the present invention operates forms no part of the present invention.

In prior art control systems, it has been traditional to use electronics or electromechanical apparatus for carrying out such functions in the control system as position sensing, command signal generation and transmission, switching and the like. Wherein electronics or electromechanical apparatus is in fact utilized in any control system certain inherent requirements and disadvantages are found.

For example, wherein the controlled member is associated with apparatus in such a manner that the ambient operating temperature thereof is extremely high, the electronic equipment or electromechanical equipment utilized with the control system must be either removed some distance from the high ambient temperature or must be placed in a specially cooled compartment or housing. When such is accomplished it is then necessary to utilize a wire harness in order to interconnect the electronics with the mechanical or the hydraeric apparatus which is utilized in the remainder of the control system.

Furthermore, when such electronic or electromechanical equipment is utilized in conjunction with mechanical or hydraeric apparatus, transducers must be utilized to simulate electronically the mechanical or hydraeric functions. When such transducers are utilized an element of delay and unreliability is introduced into the system. Furthermore, electronics or electrical switching devices such as solenoids, relays and the like, are also required in order to effect actuation of the mechanical or hydraeric apparatus which is being controlled. Unreliability of such devices as solenoids or relays is well known in the prior art.

As a result of the foregoing, very briefly presented, inherent difficulties experienced when electronics or electromechanical apparatus is utilized in control systems, it has been found that the expense of manufacturing and installing the apparatus is quite large, and that the maintenance problems and costs thereof are much larger than desired. In some applications wherein weight of the control system becomes important, it can be seen that such prior art control systems add an additional weight element, thus reducing the overall payload capable of being carried by such apparatus as aircraft.

Accordingly, it is an object of the present invention to provide a control system which is substantially insensitive to large variations in ambient temperature.

It is another object of the present invention to provide a control system which is extremely rugged, simple to manufacture and install, and requires little or no maintenance even under severe operating conditions.

It is another object of the present invention to provide a control system which requires no electronic to hydraeric simulation apparatus in order to effect proper operation thereof.

It is another object of the present invention to provide a control system which is capable of transferring or switching a command function from one part of the system to another part thereof in response to a predetermined failure in an extremely short time as compared to prior art systems.

It is another object of the present invention to provide a control system which is extremely versatile, yet which is relatively inexpensive to manufacture and operate as compared to prior art systems.

It has been found in many control system applications that it becomes necessary to utilize a redundant control system. Such is required when the overall requirements of a particular apparatus which is to be controlled requires a reliability above and beyond that which is normally available with the utilization of a single system for performance of the control function. Thus, in order to effect the desired reliability the control system is duplicated in one or more fashions in order to obtain the desired redundancy thereof.

For purposes of example only, present day aircraft provide an excellent situation wherein redundancy of control surfaces thereof are required. As is well known, present day aircraft are of two types. First is the large subsonic type aircraft wherein extremely large control surfaces are required and are such that the strength of the pilot is insufficient to move them. The second type aircraft utilized today is the extremely fast supersonic aircraft in which as a result of high speed the pressure center of the aircraft moves forward and either coincides or is forward of the center of gravity of the aircraft, thus causing the aircraft to become aerodynamically unstable at such high speeds. In either of these two situations, it is no longer possible for the pilot to manually move the control surfaces of the aircraft and thus a power assist of some type must be utilized. Similar situations can readily be recognized in other fields by those skilled in the art. To have proper reliability in such cases where a power assist or similar equipment is inserted into the system, redundancy must be relied upon so that in the event of failure of a portion of the control system, the command function thereof is switched to a different portion thereof automatically. Such redundancy can be obtained by paralleling a plurality of portions of a control system each capable of performing the command function, that is a control chain, or by paralleling individual components within a specific control chain. In any redundant control system one must be concerned with the number of control chains which are available for transfer to in the event of a failure of one and at the same time, one must also be concerned with the capability and the speed with which transfer can be effected from one control chain to another control chain in the event of a failure of one control chain.

Accordingly, it is still another object of the present invention to provide a control system which is inherently extremely reliable in that a plurality of control chains is provided to insure redundancy within a given control system.

It is a further object of the present invention to provide a redundant control system having a plurality of control chains therein wherein extremely fast and highly reliable transfer can be effected from one control chain to another in the event of failure in a predetermined manner, of one of the control chains.

It is a further object of the present invention to provide a redundant control system which is capable of utilization in the manner of paralleling control chains within a system or in the manner of paralleling individual components within a control chain within a control system.

It is a further object of the present invention to provide valve means for positively removing hydraeric pressure from a predetermined area.

It is a further object of the present invention to provide valve means for automatically removing pressure from a predetermined area and precluding the reapplication thereof to said area.

It is another object of the present invention to provide valve means for controlling the flow of hydraeric fluid.

Other and more specific objects and advantages of the present invention both as to its organization and method of operation, will become apparent from a consideration of the following description taken in conjunction with the accompanying drawings, which are presented by way of example only and are not intended as a limitation upon the scope of the present invention as defined by the appended claims, and in which:

FIG. 1 is a schematic diagram in block form of a control system in accordance with the present invention;

FIG. 2 is a schematic diagram in block form of one form of redundant control system in accordance with the present invention;

FIG. 3 is a schematic diagram illustrating more in detail the system as shown in block form in FIG. 2;

FIG. 4 is a schematic diagram of a shutoff valve in accordance with the present invention as used in a control system;

FIG. 5 is a schematic diagram of a flow control valve in accordance with the present invention as used in a control system;

FIG. 6 is a schematic diagram of an alternative embodiment of a redundant control system in accordance with the present invention; and FIG. 7 is a schematic diagram of a second alternative embodiment of a redundant control system in accordance with the present invention.

A hydraeric control system in accordance with the present invention includes a source of hydraeric fluid for application to a controlled member. A command function chain and a monitor function chain are interconnected to control application of the hydraeric fluid to the controlled member. Signal detecting means is connected to the command and monitor chains and the output of the detecting means is compared in a comparator to determine coincidence of the signals present within each of the chains. In the event of a failure or malfunction in either chain, such failure or malfunction is detected by the comparator which develops a signal in response thereto and this signal is in turn used to control a switching means through which the hydraeric fluid is applied from the source thereof to the controlled member.

Referring now to the drawings and more particularly to FIG. 1 thereof, there is illustrated in block form a control system in accordance with the present invention which includes a first source of pressure 11 referred to as $P_1$ which is connected by a conduit 12 to a command channel servovalve 13. A "command channel" may be a single or several control chains each capable of performing a command function. Any servovalve capable of responding to input signals to control application of hydraeric fluid to a desired point may be used in the system of the present invention. Such a servovalve is illustrated and described in Patent 2,947,286 and will not further be described herein. The output flow of hydraeric fluid under pressure as controlled by the command channel servovalve 13 is applied through conduit 14 to a switching valve means 15. After passing through the switching valve means 15 the hydraulic fluid flows through conduit 16 and to the controlled member 17 to effect its movement to a desired position as originally commanded by the input signals to the command channel servovalve 13.

A source of such input signals 18 is applied by way of conduits or leads 19 and 21 to the command channel servovalve 13 and simultaneously to the monitor channel servovalve 22. A "monitor channel" may be one or several control chains each capable of developing a signal identical with that developed by a command function control chain but which signal is used for purposes of comparison with the command channel signal. A monitor channel is not capable of performing a command function. It should be expressly understood, however, that the signal developed in a command channel may be used for monitoring purposes. The source of such input signals may be electrical, manual, mechanical, hydraulic, or any combination thereof as desired or utilized within a particular application to which the control system may be adapted. The monitor channel servovalve 22 is identical in structure to the command channel servovalve 13 and has a second source of hydraeric fluid under pressure 23 also designated as $P_2$, connected by way of conduit 24 thereto. The two hydraeric fluid sources $P_1$ and $P_2$ are isolated but are substantially identical insofar as pressure and capacity (that is, available flow) is concerned. Since each of the channels 13 and 22 have identical input signals applied thereto and the sources of hydraeric fluid under pressure are substantially identical, the output signals provided thereby are, under normal operating conditions, also substantially identical. The output signal from the command channel servovalve 13 is applied also by way of conduit 25 to a first signal detector 26. The output signal of the monitor channel servovalve 22 is applied by a conduit 27 to a second signal detector 28. The outputs of the signal detectors 26 and 28 are applied to a signal comparator 29 by means of conduits 31 and 32 respectively.

The purpose of the comparator 29 is to sense a predetermined relationship, such as identity or coincidence, of the signals generated by the command and monitor channel servovalves. So long as there is such predetermined relationship hydraeric fluid under pressure is applied through the switching valve means 15 to the controlled member 17. In the event however, of a failure or malfunction within the control system such as loss of pressure of one of the sources 11 or 23, malfunction in either of the servovalves 13 or 22, or the like, the comparator senses a discrepancy or noncoincidence in the signals generated by the command and monitor channel servovalves. When such discrepancy occurs, an output signal from the comparator is applied through conduit 33 to the switching valve means 15. Depending upon the particular failure which has occurred and upon the particular design features of the switching valve means 15, flow of hydraeric fluid from command channel 13 may be cut off from the controlled member 17 and the operator of controlled member 17 notified thereof by any known warning system. Alternatively in the event of failure in the monitor channel, switching valve means 15 may be maintained in its operating condition so that the command channel continues to supply a flow of hydraeric fluid to controlled member 17, but with an indication of a failure of the monitor channel to the operator of the controlled member 17.

A system of the type illustrated in FIG. 1 and above-described may function as a fail-safe control system. A fail-safe control system is to be defined for purposes of this specification and the claims appended hereto as a control system wherein upon failure thereof, control of the apparatus is transferred to some arbitrary means dependent upon the design of the particular apparatus involved and which transfer of control may or may not result in control degradation. A specific type of application in which such a fail-safe control system may be utilized is, for example, where a particular aircraft has a plurality of control surfaces each of which is capable of controlling the aircraft independently. A fail-safe control system may be interconnected to each of the control surfaces to that if one of the control systems failed, then it would shut down and the control surface connected thereto would center and be inactive thereafter. The remaining control surfaces and systems connected thereto would continue to control the aircraft. Such would also be an example of transferring control of the apparatus without a degradation in control. If a subsequent failure between the two remaining fail-safe control systems did occur, then movement of the control surface could be transferred to manual or pilot control. Such would be an indication of transfer of control with control degradation particularly if the aircraft concerned were of the large subsonic type or very high speed supersonic type above briefly referred to.

It is often required in a given apparatus that a fail-operate fail-safe control system be utilized. That is, a control system wherein there are a plurality of control chains at least two of which is capable of performing the command function. Upon a failure of one of the plurality of control chains, a transfer of command of the controlled member is effected to the remaining one of the control chains capable of performing the command function without a degradation in control of the controlled member.

A fail-operate fail-safe redundant control system is illustrated in block form in FIG. 2 to which reference is hereby made. As is shown in FIG. 2, an active chain servovalve has a source of hydraeric fluid under pressure 42 also referred to as $P_1$ applied thereto by way of conduit 43. The active chain servovalve 41 is of the type above-referred to and no additional description thereof will be given at this point. The output of the servovalve 41 is applied by way of conduit 44 to a switching valve means 45, the output of which is in turn applied by way of conduit 46 to a controlled member 47.

A standby chain servovalve 51 has a second source 52 of hydraeric fluid under pressure also referred to as $P_2$ applied thereto by way of conduit 53. The output of the servovalve 51 is applied by way of conduit 54 also to the switching valve means 45.

Dependent upon the switching position of the switching valve means 45 either active chain servovalve 41 or standby chain servovalve 51 is capable of performing the command function with respect to the position of the controlled member 47. Thus the active and standby chain servovalves provide the command channels of FIG. 2. The particular position of the switching valve means 45 and the manner in which the same is effected under any given condition will be described more in detail hereinafter.

Also provided in accordance with the present invention is a monitor channel servovalve 61 which also has a source of fluid under pressure 62 referred to also as $P_3$ applied thereto by way of conduit 63.

The output signal of the active chain servovalve 41 is also applied by way of conduit 48 to an active chain signal detecting means 49. The output of standby chain servovalve 51 is also applied by way of conduit 55 to standby chain signal detecting means 56. The output of the monitor channel servovalve 61 is applied by way of conduit 64 to a monitor channel signal detecting means 65.

A common input signal is applied to the active and standby chain servovalves and by the monitor channel servovalve respectively by way of conduits or leads 40, 50, and 60 respectively. Thus, each of the chains and the channel under normal conditions is generating a signal which is substantially identical. The signal detecting means connected to each of the chains and the channel senses the signal which is generated thereby and produces a corresponding output signal. These output signals as thus produced are compared to determine whether or not they bear the desired relationship such as being in fact identical. To accomplish this comparison there is provided a first comparator 71, a second comparator 72 and a third comparator 73.

The output signal from the active chain signal detecting means 49 is applied by way of conduits 74 and 75 to the first and second comparators 71 and 72 respectively. The output signal from the standby chain signal detecting means 56 is applied by way of conduits 57 and 58 to the first comparator 71 and the third comparator 73 respectively, while the output signal from the monitor channel signal detecting means 65 is applied by way of conduits 66 and 67 to the second comparator 72 and the third comparator 73 respectively.

Each of the comparators ascertain individually whether or not the signals applied thereto bear the desired relationship such as being identical or in coincidence insofar as phase and amplitude thereof is concerned. So long as each of the signals generated by the respective signal detecting means is in coincidence insofar as they are compared by the respective comparators to which they are connected, the active chain supplies hydraeric fluid flow through the switching valve means 45 to control the position of the controlled member 47. In the event however, of a discrepancy, which is detected by the comparators, then, depending upon the particular discrepancy, the flow of hydraeric fluid may be altered. For example, in the event of a failure in the active chain servovalve, the first and second comparators sense a lack of coincidence or identity with respect to the signals applied thereto. That is, first comparator 71 senses that the standby chain signal applied thereto does not agree with the active chain signal applied thereto and the second comparator 72 senses that the monitor channel signal applied thereto does not agree with the active chain signal applied thereto while the third comparator 73 senses that the standby chain and the monitor channel signals do in fact agree. Under these circumstances the switching valve means 45, in response to such disagreement, transfers the command function of the controlled member 47 from the active chain servovalve 41 to the standby chain servovalve 51.

In the event, however, as will become more fully apparent hereinafter, upon a failure in either the standby chain or the monitor channel, command of the controlled member remains with the active chain servovalve 41. Upon a failure or malfunction in either chain or the channel, the control system automatically functions in a fail-safe mode of operation. The preferred embodiment of the present invention by which control as outlined in the block diagram of FIG. 2 and as above described is effected, is more fully set forth in FIG. 3 to which reference is hereby made.

The same reference numerals as used in FIG. 2 are carried over and utilized in FIG. 3 to thus maintain the identity of the various parts. As is also illustrated in FIG. 3 the detailed portions included within the blocks of FIG. 2 are identified by utilization of dashed lines labelled with the same reference numerals as used with respect to the various blocks in FIG. 2.

Since the various portions of each of the active and standby chains and the monitor channel is substantially the same, a detailed description of the active chain only is set forth below with the understanding that the description applies with respect to the standby chain and the monitor channel except with respect to the specific switching which will be described in more detail.

As is illustrated in FIG. 3, the active chain servovalve 41 includes a torque motor 101 to which electrical signals $e_{in}$ may be applied to effect movement of the armature 102 as is well known. Also connected to the armature 102 is a mechanical input terminal 103 to which mechanical input signals may be applied. The armature 102 has connected thereto a pilot valve or flapper 104 which is disposed between a pair of nozzles 105 and 106 which are connected to the source of hydraeric fluid under pressure $P_1$ through restriction orifices 107 and 108 respectively, and forms a first transducer means to provide a pressure control signal as is well known in the prior art. Movement of the flapper 104 causes a pressure differential to appear across opposite ends of a valve means in the form of the spool valve 109 causing it to in turn translate within the cylinder 110. Such translation causes hydraeric fluid to flow through conduits 111 and 112 from the source $P_1$ thereof ultimately to the controlled member 47 which, as illustrated in FIG. 3, is a tandem actuator as is well known in the prior art. A feedback spring 113 is interconnected between the spool valve 109 and flapper 104 as is also well known.

Thus it is seen that the active chain servovalve 41 controls the flow of hydraeric fluid under pressure to the controlled member in response to signals applied thereto. In order to detect the signals generated by the active channel servovalve 41 the signal detecting means 49 is connected thereto. As is illustrated in FIG. 3 the signal detecting means 49 is interconnected to the spool valve 109 by means of a flapper 115 having one end grounded as shown at 116, and the other end in sliding engagement with the spool valve 109. Thus, as the spool valve 109 translates within the chamber 110, it carries with it the upper end of the flapper 115, thus causing flapper 115 to bend and move in response to movement of spool valve 109.

Nozzle means 117 is positioned adjacent flapper 115 and conducts fluid under pressure from source $P_1$ through restriction orifice 118 into contact with flapper 115. Under these circumstances, as flapper 115 approaches the outlet orifice of nozzle 117 more closely, an output signal increasing in pressure is generated in conduit 119 which occurs in response to spool valve 109 moving toward the left as viewed in FIG. 3. Alternatively, as spool valve 109 moves toward the right as viewed in FIG. 3, the pressure signal generated in conduit 119 decreases. Thus, it can be seen that the combination of the flapper 115 and the nozzle means 117 provides a second transducer means which functions as a position detecting apparatus which detects the position of spool valve 109 and provides a hydraeric pressure signal in response thereto. The output signal thus generated by the active chain signal detecting means 49 is applied by way of conduits 74 and 75 to comparators 71 and 72, respectively.

Referring now to the comparator 71, it can be seen that the comparator 71 comprises a cylinder 121 having a spool valve 122 disposed slidably therein. The spool valve 122 is centered under quiescent conditions by springs 123 and 124 seated at each end thereof and bearing against the end walls of the cylinder. A pair of pressure return conduits 125 are interconnected with the chamber 121 and with the system return $R_1$ for pressure source $P_1$ as applied to the active chain and as is shown at 126. The pressure return conduits 125 are closed under normal operating conditions by the lands 127 and 128 on the spool valve 122. Under quiescent operating conditions, that is when the pressure applied to both sides of the comparator 71 is substantially identical, pressure $P_1$ is present in conduit 76 and has been applied from the source thereof as shown at 131 through the shutoff valve 132, which will be described more fully hereinbelow, to the conduit 76. The pressure $P_1$ is in turn applied by way of conduits 133 and 134 to engage valves 135 and 136 which again will be described more fully hereinbelow. So long as the signals applied by the active chain signal detecting means 49 and the standby chain signal detecting means 56 are substantially identical, the engage valve 136 and the shutoff valve 132 remain in the position illustrated in FIG. 3 and flow of the hydraeric fluid under pressure is effected from the source $P_1$ as shown at 42 through the conduits 111 and 112, the engage valve 135 at chambers 137 and 138 thereof, to the chamber 139 of the controlled member 47.

The standby chain signal detecting means 56 and the monitor channel signal detecting means 65 each provide output signals indicative of the position of the spool valve within the respective servovalve to which the signal detecting means is connected in each instance. The output or position signals thus generated are applied to each of the comparators in the manner referred to above during the discussion of FIG. 2. Since the input signals to each of the servovalves whether they be electrical, mechanical, or otherwise applied are all identical, the movement of the spool valve in each case is also identical and the signal detecting means output signal is in each case substantially identical. So long as such is the case, the apparatus in accordance with the present invention, remains in the position indicated in FIG. 3 and continues to have the active chain command the position of the actuator 47.

In the event of a discrepancy between two of the signals generated by the signal detecting means, then the shutoff and engage valves are actuated to alter the pressure and/or the fluid flow.

SHUTOFF VALVE

Each of the shutoff valves 132, 142, and 152 are associated with the active and standby chains and the monitor channel respectively, is identical in construction and operation. Therefore, a detailed description only of the shutoff valve 132 will be given in conjunction with FIG. 4 to which reference is now made. As is illustrated in FIG. 4, the shutoff valve 132 comprises a cylinder 143 having a bore 144 of a first diameter and a bore 145 of a second and greater diameter. Disposed within the bore 144 is a spool valve 147, while disposed within the bore 145 is orifice valve 148. One end face of spool valve 147 is subjected to a source of force such as that exerted by spring means 150. Alternatively, the source of force may be hydraeric as shown in FIG. 3 at 131, 149 and 149a by porting bore 144 and connecting the pressure sources $P_1$, $P_2$ and $P_3$ thereto. The force generated by either spring means 150 or hydraeric sources $P_1$, $P_2$, or $P_3$ is substantially identical. Orifice valve 148 has a transverse bore 153 therein which, when the valve 148 is in the position illustrated, communicates with source of pressure $P_1$ at 131 by way of conduit 154. A longitudinal bore 155 is also provided in the orifice valve 148 and communicates with the bore 153 and thus the source of pressure $P_1$. A restriction orifice 156 is provided in the bore 155 for purposes well known in the prior art. Resiliently deformable means such as a spring 157 is seated about a shoulder 158 formed in the face 159 of the orifice valve 148. The force generated as a result of the spring 157 and the source of pressure $P_1$ present within the conduit 76 operating upon the face 159 of the valve 148 is greater than the force generated as a result of the spring 150 operating upon the left face of the valve 147 disposed within the bore 144. Therefore, the force thus generated maintains the valves 147 and 148 in the position illustrated in FIG. 4.

It should also be noted that the bore 145 is ported to return as to return $R_1$ at 161 for source $P_1$, as is illustrated at 162 and 164. Also provided in the valve 148 is an unrestricted shorting bore 165 which communicates with conduit 76 at one end thereof. The shorting bore at its opposite end terminates at the surface of orifice valve 148, however, in the normal operating condition of the control system this opposite end is closed by the walls defining bore 145.

Under normal operating conditions, that is when the comparators 71, 72, and 73 find no errors insofar as the signals applied thereto are concerned, the shutoff valve connected to each of the comparators remains in the nonactuated position such as that illustrated in FIG. 4 for shutoff valve 132. As was above referred to, the shutoff valve is maintained in the position illustrated in FIG. 4 by having exerted thereon a greater pressure on the right hand portion, as viewed in FIG. 4, than on the left hand portion thereof. This greater force is applied in the case of the construction of the shutoff valve as shown in FIG. 4 by the combination of the force of spring 157 and the pressure in conduit 76 acting upon the face 159 of the orifice valve 148 being greater than the force applied by the spring 150 acting on the left hand face of the spool valve 147. As above pointed out, the pressures $P_1$, $P_2$ or $P_3$ (FIG. 3) or the force of spring 150 (FIG. 4) are substantially identical and one may replace the other if such is desired where there are more than two sources of hydraeric pressure available.

Assuming now that the comparator 71 has a differential pressure applied thereacross causing the spool valve 122 to translate toward the left as viewed in FIG. 3, it can be seen that conduit 76 is thus ported through the comparator 71 by way of conduits 125 to return $R_1$ as illustrated at 126. Upon the occurrence of the connection of conduit 76 to return $R_1$ at 126, it can be seen that the only pressure applied to the right hand side of the shutoff valve 132 is the pressure of spring 157 acting against the shoulder 158. Hydraeric pressure source $P_1$ at 131 is connected through bore 155 and restriction orifice 156 to conduit 76 thus precluding any substantial loss of force from source $P_1$. Thus, the left end face of spool valve 147 has the force from source $P_1$ applied thereto. The force generated by source $P_1$ (FIG. 3) or spring 150 (FIG. 4) acting against the left end face of spool valve 147 is greater than the force generated by spring 157 alone. Under these circumstances orifice valve 148 is translated toward the right as viewed in FIGS. 3 or 4. As the valve 148 translates toward the right as viewed in FIG. 4, the conduit 154 is first cutoff by moving the bore 153 out of register therewith. After this occurs, the shorting bore 165 registers with the port 164 thus connecting the conduit 76 directly to the return $R_1$ at 161. By thus connecting conduit 76 directly to return $R_1$ through the unrestricted shorting bore 165, a fluid flow therein is ported directly and unrestricted to return. Therefore, the system in accordance with the present invention has an extremely fast switching time as will become more fully apparent from a discussion of the engage valve hereinbelow.

From the above discussion, it should now become apparent that the shutoff valve 132 is a lock out type mechanism such that once it has translated to the right, it cannot return to the position illustrated in FIG. 4. As shown in FIG. 3, once actuated the shutoff valve 132 cannot return to the illustrated position so long as pressure source $P_1$, $P_2$ or $P_3$ is present within the system.

In the event of a loss of hydraeric source $P_1$, shutoff valve 132 translates to the right as viewed in FIG. 3 or 4. As shown in FIG. 3, hydraeric source $P_2$ overcomes the force of spring 157 while as shown in FIG. 4 the force of spring 150 overcomes the force of spring 157.

ENGAGE VALVE

The flow of hydraeric fluid from the servovalve 41 to the actuator 47 is controlled by operation of the engage valve 135 which is schematically illustrated in FIG. 5 to which reference is now made. As is illustrated in FIG. 5, the engage valve 135 includes a cylinder 171 within which a spool valve 172 is slidably disposed. The spool valve 172 includes lands 173, 174, and 175 interconnected in the usual and well known manner. Translation of the spool valve 172 within the cylinder 171 controls the flow of hydraeric fluid through conduits 111 and 112, the chambers 137 and 138 respectively, and therefrom to the actuator 47. The translation of the spool valve 172 in turn, is controlled by the application of forces to either end thereof.

Under normal quiescent operating conditions, that is when no error is detected by the comparators 71, 72, or 73, the spool valve 172 is in the position illustrated in FIG. 5. Movement to this position is effected since the sum of the forces applied to the right side of land 175 of spool valve 172 by the spring 176 and the pressure from source $P_1$ appearing in conduit 133 is greater than the forces applied to the left end face of the land 173 of spool valve 172. The forces applied to the left end face of land 173 are generated by the pressure from source $P_2$ at 177 acting by way of conduit 178 on the left end face of spool valve 179 which is slidably disposed within the cylinder 181. Also pressure $P_1$ as shown at 182 acting through conduit 183 acts upon the left end face of spool valve 184 also housed slidably within the cylinder 181. Simultaneously, the source $P_1$ at 182 acts upon the right end face of spool valve 185 also slidably disposed within the cylinder 181 while source $P_3$ at 186 as shown in FIG. 3 acts through conduit 187 upon the left end face of the spool valve 185. Source $P_3$ is identical to sources $P_1$ and $P_2$ in pressure and capacity. Thus, it is seen that the pressures $P_1$ and $P_3$ acting on each end face of valve 185 cancel each other while pressures from sources $P_1$ and $P_2$ acting on each end face of valve 184 cancel each other. Thus, the net force appearing on the left end face of land 173 of the spool valve 172 is the source $P_2$ acting against the left end face of spool valve 179 which is insufficient to overcome the pressure appearing at the right end face of land 175 as above described. As illustrated in FIG. 3 the spool valve 179 may have a spring 180 applying force to the left end face thereof as opposed to a source of hydraeric pressure. Under these conditions the force of spring 180 is selected to be substantially equal to the pressure of source $P_1$ acting against the right end face of valve 172.

It should also be noted that an additional spool valve 191 is slidably disposed within cylinder 192 which is connected by way of conduit 193 to conduit 77 which in turn is connected to comparator 72. It should be noted that the force generated by the pressure from source $P_1$ appearing in conduit 193 under quiescent conditions and acting upon the right end face of spool valve 191, is equivalent to the force generated by the pressure $P_1$ acting in conduit 133 under quiescent conditions upon the right end face of land 175 of spool valve 172. Thus, under quiescent conditions, the force generated in chamber 194 and in chamber 195 by the pressures are identical and are connected in parallel insofar as spool valve 172 is effected thereby.

In the event of an error occurring in such a manner that comparator 71 causes the conduit 76 to be connected to return 161 as above described in connection with FIG. 4, it can be seen that the chamber 195 by way of conduit 133 is also connected to return. However, since pressure appears in the chamber 194, thus causing the valve 191 to be translated to the left as illustrated in FIG. 5, the spool valve 172 remains in the position illustrated in FIG. 5 and hydraeric fluid continues to flow through the conduits 111 and 112 to the actuator 47. If, however, an error has occurred in such a manner that the comparator 72 has interconnected the conduit 77 to return and the shutoff valve 142 has been actuated in a manner similar to that as described in conjunction with shutoff valve 132 above, then the chamber 194 is also connected to return. Under these circumstances the force applied to the right end face of the land 175 of the spool valve 172 is only that of the spring 176. Therefore, the pressure $P_2$ acting upon the left end face of the valve 179 overcomes the pressure of the force of spring 176 causing the spool valve 172 to immediately translate toward the right as viewed in FIG. 5. The translation of the spool valve 172 toward the right as illustrated in FIG. 5 causes land 173 to shutoff conduit 111 and land 174 to shutoff conduit 112. Thus, there is no hydraeric flow into chambers 137 and 138 from the servovalve 41. Simultaneously, the chambers 137 and 138 are connected to return $R_1$ at 196 by way of conduits 197 and 198 respectively being opened by the movement of lands 174 and 175 toward the right. Therefore, any attempted pressure buildup within the actuator 47 is eliminated since any fluid flow resulting from movement of the actuator 47 is immediately conducted directly to return $R_1$ at 196.

It should also be noted that the forces acting on the left end face of spool valve 172 by means of the combination of the pressures $P_1$, $P_2$ and $P_3$ or spring 180 (FIG. 3) acting upon valves 184, 179, and 185 respectively is arranged in such a manner that in the event of failure of any two of the three pressure sources, the remaining third one or the spring 180 (FIG. 3) is still capable of translating the spool valve 172 toward the right to cut off the flow of hydraeric fluid through conduits 111 and 112 as above described.

Engage valve 136 is similar in contruction and operation to engage valve 135. However, engage valve 136 is utilized to control the flow of hydraeric fluid from servovalve 51 to the actuator 47. As is seen in FIG. 3, the engage valve 136 is interconnected by way of conduits 201 and 202 through the chambers 203 and 204, conduits 205 and 206 to the right portion 207 of the actuator 47. It should also be noted that during the period of time that the engage valve 135 is in the position as illustrated in FIG. 3 and in FIG. 5, the engage valve 136 disconnects any flow of fluid from the servovalve 51 to the actuator 47. During such time, the conduits 205 and 206 are connected by way of chambers 203 and 204 to return $R_1$ as shown at 208.

The forces generated on the respective sides of the spool valve 209 are such that under quiescent conditions, it remains in the position shown in FIG. 3. However, in the event of comparators 71 and 72 connecting conduits 76 and 77 to return as above described in such a manner that the shutoff valves 132 and 142 actuate, it should be noted that the chamber 211 and the chamber 212 are each also connected directly to return. Since these two chambers are connected to return, the sum of the forces appearing at the left end face of spool valve 209 is greater than the force of the spring 213 in chamber 211 and the chamber 212 are each also connected directly to return. Since these two chambers are connected to return, the sum of the forces appearing at the left end face of spool valve 209 is greater than the force of the spring 213 in chamber 211 and the spool valve 209 is caused to translate to the right as seen in FIG. 3. This translation occurs simultaneously with the translation of spool valve 172 and engage valve 135. As the spool valve 209 is translated to the right, the return $R_2$ at 208 is disconnected from chambers 203 and 204 and the conduits 201 and 202 are connected to chambers 203 and 204 respectively thus interconnecting the flow of hydraeric fluid from the servovalve 51 to the right side 207 of the actuator 47.

It should be noted that as the spool valves 172 and 209 translate toward the right as above described the hydraeric fluid appearing in chambers 195 and 211 which are interconnected by conduits 133 and 134 with conduit 76 and the hydraeric fluid appearing in chambers 194 and 212 which are interconnected by conduits 193 and 214 respectively to conduit 77, is immediately expelled through the shunting bore in the shutoff valves 132 and 142 respectively, the shunting bore in valve 132 being shown at 165. Thus, there is no delay in movement of the spool valve in the engage valves 135 and 136 to effect a transfer of the flow of hydraeric fluid from servovalve 41 to servovalve 51. By the utilization of the direct connection of the respective chambers above mentioned to return, with no obstructions in the flow, hydraeric switching times on the order of 6 milliseconds are readily accomplished.

Continuing further from the example above given where engage valves 135 and 136 have each moved toward the right to transfer the flow of hydraeric fluid from servovalve 41 to servovalve 51, it will now be assumed that comparator 73 senses a discrepancy and translate in such a manner that conduit 78 is now connected to return $R_2$ as shown at 217 in FIG. 3. Upon such an occurrence the shutoff valve 152 actuates as above described to permanently connect conduit 78 to return $R_2$ as shown at 218. Such operation connects chamber 219 to return $R_2$ at 218. When this occurs, the sum of the forces applied to spool valves 221, 222, and 223 by the sources of pressure $P_2$, $P_1$ and $P_3$ respectively as shown at 224, 225, and 226, translate the valves 221, 222, and 223 along with the valve 227 toward the left as viewed in FIG. 3. This movement translates the entire engage valve 136 toward the left to carry the spool valve 209 to the position as illustrated in FIG. 3 to shutoff the flow of hydraeric fluid through conduits 201 and 202 to the actuator 47. Thus, the control system as illustrated in FIG. 3 is removed from control of the actuator 47 and control thereof is transferred an another system or to a manual mode of control in accordance with the design parameters of the particular system in which the redundant control system is incorporated.

From the above description, it should then become clear that what has been disclosed and described in conjunction with FIG. 3 is a redundant control system of the fail-operate, fail-safe type.

The operation of the system as shown in FIG. 3 in the event of a failure in the active or standby chains or the monitor channel, whether as a result of an input signal, a malfunction in the servovalve, or a loss of the pressure applied thereto, is as set forth in the chart which follows hereinbelow.

| Failure | Comparator | | | Shut Off Valve | | | Engage Valve | | System Transfers To— |
| --- | --- | --- | --- | --- | --- | --- | --- | --- | --- |
| | 71 | 72 | 73 | 132 | 142 | 152 | 135 | 136 | |
| Active Channel [1] | Connects conduit 76 to R[1]. | Connects conduit 77 to R[1]. | | Removes P[1] from conduit 76. | Removes P[1] from conduit 77. | | Disconnects flow of active channel from actuator. | Applies flow of standby channel to actuator. | Fail-Safe.[2] |
| Standby Channel [1]. | ___do___ | | Connects conduit 78 to R[2]. | ___do___ | | Removes P[2] from conduit 78. | | Locks in no-flow position. | Do. |
| Monitor Channel [1]. | | Connects conduit 77 to R[1]. | ___do___ | | Removes P[1] from conduit 77. | ___do___ | | ___do___ | Do.[3] |
| P[1] and P[2] | | ___do___ | ___do___ | Removes P[1] from conduit 76. | ___do___ | ___do___ | Disconnects flow of active channel from actuator. | ___do___ | Off. |
| P[1] and P[3] | Connects conduit 76 to R[1]. | | ___do___ | ___do___ | ___do___ | ___do___ | ___do___ | ___do___ | Off. |
| P[2] and P[3] | ___do___ | Connects conduit 77 to R[1]. | | ___do___ | ___do___ | ___do___ | ___do___ | ___do___ | Off. |

[1] Failure may be hydraeric, electrical or mechanical or a combination thereof.
[2] Upon a subsequent failure of either of remaining channels system transfers to off position by engage valve 136 disconnecting flow of standby channel to actuator.
[3] Upon a subsequent failure of either of remaining channels system transfers to off position by engage valve 135 disconnecting flow of active channel from actuator.

An alternative system wherein only two sources of pressure are utilized, as shown in FIG. 6 to which reference is hereby made. As is therein shown active and standby chain servovalve apply controlled sources $P_a$ and $P_s$ of hydraeric fluid flow to their respective engage valves much in the same manner as above described in conjunction with FIG. 3. The comparators and shutoff valves of FIG. 6 are similar to those illustrated in FIG. 3 and will not be described in further detail.

The signal detecting apparatus used in conjunction with each servovalve is somewhat different and employs a flapper 251 having one end grounded as at 252 and the other end (not shown) in contact with the servovalve spool valve. A pair of nozzles 253 and 254 are connected to source of pressure $P_a$. Movement of flapper 251 generates a pressure differential output signal across the nozzles 253 and 254. The signal present at nozzle 253 is connected by way of conduit 255 to the left side of comparator 257 while the signal at nozzle 254 is connected by way of conduit 256 to the left side of comparator 258. The right side of comparator 257 is connected by conduit 261 to the left nozzle of the standby chain servovalve while the right nozzle thereof is connected through conduit 262 to the left side of comparator 259.

Through use of the pair of nozzles and flapper in each chain signals are generated which are indicative of the position of the spool valve in each of the servovalves. However, it should be noted that only one-half of the signals thus developed at the output of each of the monitor chains is utilized at the comparators. That is, the signal developed at the right nozzle in monitor chain 1 servovalve is applied to the right side of comparator 258, while the signal developed at the right nozzle of monitor chain 2 servovalve is applied to the right side of comparator 259. The two signals appearing at the left nozzle of each of the monitor chains 1 and 2 are not utilized since only three comparators are needed to carry out the switching and decision making requirements in accordance with the system of the present invention. It should however be understood that the output signal at each of these two monitor chain nozzles not utilized herein may be applied as signals to other systems or to a dummy load as the case may be in accordance with any desired application and as indicated by the dotted line apparatus 260 connected thereto.

The active chain shutoff valve 271 is connected by way of conduit 265 to comparator 257 which is also connected to return $R_a$ at 267. The standby chain shutoff valve 272 is connected by way of conduit 266 to comparator 258 which in turn is connected to return $R_a$ at 268. The monitor chain shutoff valve is similarly connected to the comparator 259.

Thus, it can be seen that there is an active chain utilizing a first source of pressure $P_a$ and a monitor chain 1 utilizing the same source of pressure. There is also a standby chain using the source of pressure $P_s$, and a monitor chain 2 utilizing the same source of pressure $P_s$. There is thus means for arriving at a decision in the event of an error as to wherein the error actually lies. When such a decision, which in each case is made at the comparators, has been reached, the desired switching as may be required is then accomplished.

In operation of the system as illustrated in FIG. 6, if a failure occurs in the active chain then such will be determined by comparators 257 and 258 connecting conduits 265 and 266 to return $R_a$ as shown at 267 and 268. The active and standby chain shutoff valves 271 and 272 each operates in the manner described above to effect a translation of the respective spool valves found in the active and standby chain engage valves to thus transfer the flow of hydraeric fluid into the actuator 273 from the active chain to the standby chain. In the event of a subsequent failure, operation of the standby chain engage valve is effected by movement of the monitor chain shutoff valve to thus place the entire system into a fail-safe mode of operation.

On the other hand, a failure occurring in the standby chain is detected by comparators 257 and 259 thus actuating the active chain and monitor chain shutoff valves which in turn causes a translation of the standby chain engage valve in such a manner that the command function of the system cannot be transferred from the active chain to the standby chain. In the event of a subsequent failure, the system is then placed into a fail-safe mode.

In the event of a failure of either of the monitor chains, the active and standby chain engage valves are interconnected with the standby and monitor chain shutoff valves in such a manner that a translation of each of the engage valves is effected to transfer the command function of the system from the active to the standby chain servovalves and to place the system in the condition so that if a subsequent failure occurs, the system will go into the fail-safe mode of operation.

Specific operation of an engage valve in accordance with the present invention utilizing only two sources of pressure is illustrated with respect to the active chain engage valve in FIG. 6. As is therein shown, hydraeric fluid passes by way of the conduits 301 and 302 through the spool valve 303 and by way of the outgoing conduits 304 and 305 to the actuator 273. Such occurs during the quiescent operating condition wherein no failures have been detected by the system. Under these conditions, the pressure supplied by the source $P_s$ at 306 and the source $P_a$ at 307 on each side of the valve 308 balances and no net force is applied thereby. The source of pressure $P_a$ appears in conduit 265 and thus in chamber 309 during normal operating conditions and also in conduit 266 and in chamber 311. Pressure $P_s$ appears in conduit 310 and thus in chamber 312. Under these conditions, the net force occurring on the right end face of valve 313 is sufficient to maintain valve 313 in the position shown so long as there is a pressure in chamber 312. The pressure appearing in chamber 311 is sufficient to maintain valve 315 in the position shown against the pressure appearing in chamber 309.

Assuming now that a failure occurs in the active chain thus causing the active and standby channel shutoff valve to actuate, the chambers 309 and 311 are shorted to return. The net force then appearing at the left end face of the spool valve 303 is sufficient to cause the active channel engage valve to translate to the right cutting off the flow of hydraeric fluid from the active chain servovalve to the actuator 273. A similar operation simultaneously occurs in the standby chain engage valve to transfer the command function to the standby chain servovalve.

In the event a failure occurs in the standby chain comparators 257 and 259 connect conduits 265 and 310 respectively to return. As a result thereof chambers 309 and 312 are also connected to return. However, pressure still appears in chamber 311. Under these conditions only valve spool 313 moves toward the right as viewed in FIG. 6. A similar operation occurs in the standby chain engage valve and the command function remains with the active chain.

If a failure occurs in the monitor chain 1 then comparator 258 connects chamber 311 to return causing the active chain engage valve to translate to the right along with a similar operation in the standby chain engage valve thus transferring the command function to the standby chain. However, a failure in the monitor chain 2 connects chamber 312 to return causing only valve-spool 313 to move to the right.

If both pressure sources $P_a$ and $P_s$ are lost, then spring 314 applies a force which is sufficient to cut off flow through active engage valve to actuator 273. Standby engage valve remains in its cut off position and the control system of FIG. 6 is rendered incapable of moving actuator 273.

From the foregoing description it should now be obvious to those skilled in the art that features of the two systems above described in detail may be combined to provide operable control systems adapted for given operational conditions without departing from the scope of the present invention. For example in the event a particular application is limited to only two sources of hydraeric fluid under pressures the single nozzle detecting means may still be utilized. Under these conditions, two monitor chains would be utilized in addition to the active and standby chains and one pressure source would be connected to each monitor as shown in FIG. 6. One nozzle would be used as the detecting means in each chain. The logic through interconnection to the comparators would be as shown in FIG. 3 with the exception that the conduit 67 would be connected to the second monitor. Such a system is illustrated in FIG. 7 to which reference is hereby made. The same or similar parts from the systems above described are designated by the same reference numerals or other designation and no further detailed description is deemed necessary at this point.

There has been thus disclosed a hydraeric control system which is rugged, temperature insensitive, fast operating, and may be used in a redundant mode of operation. Although the control systems disclosed herein have been described in some detail, along with some components thereof, such is to be taken by way of example only and not as a limitation upon the scope of the appended claims.

What is claimed is:
1. A hydraerically powered control system for applying a hydraeric command signal to a controlled member in response to input signals applied to said system comprising:
   (a) a plurality of channels at least one of which is adapted for providing a hydraeric command signal to said controlled member, each of said channels including:
      (1) a hydraeric power amplifier means including a spool valve movable responsive to said input signals, and
      (2) passive follower means coupled to said spool valve for generating a hydraeric signal indicative at all times of the actual position of said spool valve;
   (b) hydraeric comparator means connected to each of said passive follower means for determining coincidence of the hydraeric signals generated thereby and to produce a failure indicating signal in the event of non-coincidence thereof; and
   (c) valve means interconnected with said at least one channel and said compartor means and responsive only to said failure indicating signal to alter the hydraeric signal applied to said controlled member.

2. A control system as defined in claim 1 in which said passive follower means includes a flapper having one end thereof slidably engaging said spool valve and moveable by said spool valve and a nozzle having an orifice positioned adjacent said flapper.

3. A control system as defined in claim 2 in which said valve means includes a pressure sensitive lock out means operable in response to said failure signal to remove hydraeric pressure from a preselected portion of said valve means thereby to effect said alteration of said command signal.

4. A hydraerically powered redundant control system for applying a flow of hydraeric fluid to a controlled member in response to input signals applied to said system comprising:
   (a) first, second and third hydraeric chains, at least two of said chains being adapted for providing a flow of hydraeric fluid to said controlled member, each of said chains including:
      (1) a hydraeric power amplifier means including a spool valve movable responsive to said input signals, and
      (2) passive follower means coupled to said spool valve for generating a hydraeric signal indicative at all times of the actual position of said spool valves;
   (b) and hydraerically actuated control means for determining which of said chains will supply said flow comprising:
      (1) hydraeric comparator means connected to each of said passive follower means for detecting differences in hydraeric signals generated thereby and to produce an error signal in response to detected differences, and
      (2) hydraeric pressure actuated valve means interconnected with said comparator means and said chains to alter the flow pattern of hydraeric fluid to said controlled member in response to an error signal generated as a result of a detected difference in hydraeric signals generated by said passive follower means within each of said chains.

5. A redundant control system as defined in claim 4 in which said passive follower means is a flapper slidably connected at one end to said spool valve and rigidly anchored at the opposite end thereof, and a nozzle means having an orifice positioned adjacent said flapper whereby the distance between said orifice and said flapper changes as said spool value moves thereby producing a pressure signal in said nozzle indicative of the position of said spool valve, said pressure signal being connected to said comparator means.

6. A redundant control system as defined in claim 4 in which said comparator means includes a spool valve slidably disposed within a cylinder and having hydraeric signals generated within two different chains applied one to each end of said spool valve, said cylinder defining first and second ports, said first port being connected to said pressure actuated valve means and said second port being connected to return, said spool valve being movable only in response to a difference in said signals applied to each end thereof thereby to connect said valve means to return.

7. A redundant control system as defined in claim 6 in which said comparator means further includes spring means of equal force positioned at opposite ends of said spool valve.

8. A redundant control system as defined in claim 6 in which said pressure actuated valve means includes a piston slidable between first and second positions and disposed within a cylinder defining a port connected to said return, said piston in said first position closing said port and in said second position opening said port, said piston being movable to said second position in response to said spool valve in said comparator moving to connect said valve means to return.

9. A hydraerically powered redundant control system for applying a flow of hydraeric fluid to a controlled member comprising:
 (a) an active hydraeric signal producing chain;
 (b) a standby hydraeric signal producing chain;
 (c) a monitor hydraeric signal producing chain;
 (d) first switching valve means connected between said active chain and said controlled member to control the flow of hydraeric fluid therebetween said first switching valve means being normally open;
 (e) second switching valve means connected between said standby chain and said controlled member to control the flow of hydraeric fluid therebetween, said second switching valve means being normally closed;
 (f) first comparator means connected between said active and said standby chains for comparing the signals developed thereby;
 (g) second comparator means connected between said active and said monitor chains for comparing the signals developed thereby;
 (h) third comparator means connected between said standby and said monitor chains for comparing the signals developed thereby; and
 (i) switching valve control means connected between said comparators and said switching valve means and responsive only to a non-coincidence in the hydraeric signals present in said chains to selectively actuate one of said switching valve means.

10. A redundant control system as defined in claim 9 in which said monitor signal producing chain includes first and second servovalves connected respectively to first and second sources of hydraeric fluid, said first monitor servovalve having first signal detecting means connected to said second comparator, and said second monitor servovalve having second signal detecting means connected to said third comparator.

11. A redundant control system as defined in claim 10 in which each of said chains includes a servovalve having a spool valve movable therein and signal detecting means including a flapper slidably connected to each spool valve and a pair of nozzles having orifices spaced on opposite sides of said flapper, said first and second sources of fluid being connected respectively to said active and standby chains.

12. A redundant control system as defined in claim 9 in which said switching valve control means includes first, second, and third shutoff valves connected respectively between said first, second, and third comparators and one of said switching valve means.

13. A redundant control system as defined in claim 12 in which each of said shutoff valves includes a piston slidable between first and second positions in a cylinder defining first and second ports, said first port being connected to a source of hydraeric pressure and said second port being connected to return for said source of pressure, said piston in said first position having an orifice registering with said first port to apply said pressure to said switching valve means, and said piston in said second position having an orifice registering with said second port to connect said switching valve means to return.

14. A control system for positioning a movable member in response to applied signals, comprising: a first transducer means for receiving at least one control signal to provide a representative hydraeric pressure control signal; a valve means connected to receive said hydraeric pressure control signal, for physically displacing said movable member in accordance with said hydraeric pressure control signal; a second transducer means coupled to said valve means for providing a hydraeric pressure position indicating signal in accordance with displacement of said valve means; and means for disabling said control system, operative under control of said hydraeric pressure position indicating signal.

15. A system according to claim 14 wherein said first transducer means includes a flapper valve means, comprising a flapper member positioned by at least one control signal.

16. A system according to claim 14 wherein said valve means comprises a spool valve controlled by said hydraeric pressure control signal, and an actuator means connected to be controlled by said spool valve means.

17. A composite system including a plurality of control systems according to claim 14, and further comprising means for comparing the hydraeric pressure position indicating signals from each of said control systems whereby to selectively disable a nonconforming control system.

18. A composite system in accordance with claim 17 wherein said first transducer means each comprise a flapper valve, including a flapper and means for displacing said flapper in accordance with a mechanical signal and an electrical signal in combination.

19. A composite system in accordance with claim 17 wherein said valve means in each of said control systems comprises a spool valve connected to be positioned in accordance with said control signal in said control system; an actuator connected to said movable member and controlled by said spool valve; and further wherein said second transducer means comprises a flapper valve having a flapper positioned by said spool valve.

20. A system according to claim 14 wherein said valve further includes means to provide hydraeric amplification to replace said movable member.

References Cited

UNITED STATES PATENTS

| | | | |
|---|---|---|---|
| 2,995,014 | 8/1961 | Horky et al. | 91—438 |
| 3,027,878 | 4/1962 | Keyt et al. | 91—411 |
| 3,120,787 | 2/1964 | Schmitt | 91—28 |
| 3,143,042 | 8/1964 | Borgeson et al. | 91—367 |
| 3,190,185 | 6/1965 | Rasmussen | 91—411 |
| 3,222,993 | 12/1965 | Rasmussen | 91—363 |
| 3,270,623 | 9/1966 | Garnjost et al. | 91—387 |
| 3,295,420 | 1/1967 | Gleason | 91—413 |

MARTIN P. SCHWADRON, *Primary Examiner.*

B. L. ADAMS, *Assistant Examiner.*